(12) United States Patent
Härer et al.

(10) Patent No.: US 8,036,453 B2
(45) Date of Patent: Oct. 11, 2011

(54) ANALYTICAL METHOD FOR A NUMBER OF TWO-DIMENSIONAL PROJECTION IMAGES OF A THREE-DIMENSIONAL EXAMINATION OBJECT

(75) Inventors: Wolfgang Härer, Erlangen (DE); Marcus Pfister, Bubenreuth (DE)

(73) Assignee: Siemens Aktiengesellschaft, Munich (DE)

( * ) Notice: Subject to any disclaimer, the term of this patent is extended or adjusted under 35 U.S.C. 154(b) by 987 days.

(21) Appl. No.: 11/986,857

(22) Filed: Nov. 27, 2007

(65) Prior Publication Data
US 2008/0123928 A1    May 29, 2008

(30) Foreign Application Priority Data
Nov. 27, 2006  (DE) .................. 10 2006 055 934

(51) Int. Cl.
*G06K 9/00*    (2006.01)

(52) U.S. Cl. .................. 382/154; 382/131; 382/130
(58) Field of Classification Search .................. 382/154
See application file for complete search history.

(56) References Cited

U.S. PATENT DOCUMENTS

| 7,039,152 B2 | 5/2006 | Bruder et al. | |
| 2005/0020902 A1* | 1/2005 | Janes | 600/407 |
| 2005/0111622 A1* | 5/2005 | Bruder et al. | 378/95 |

FOREIGN PATENT DOCUMENTS
DE    103 54 214 A1    6/2005

OTHER PUBLICATIONS

Thomas Mertelmeier, Jasmina Orman, Wolfgang Haerer and Mithun K. Dudam, "Optimizing filtered backprojection reconstruction for a breast tomosynthesis prototype device", Advanced Optical and Quantum Memories and Computing III. Edited by Coufal, Hans J.; Hasan, Zameer U.; Craig, Alan E. Proceedings of the SPIE, vol. 6142, pp. 131-142 (2006).

Günter Lauritsch and Wolfgang H. Härer, "A theoretical framework for filtered backprojection in tomosynthesis", Proceedings of the SPIE Medical Imaging Conference, Image Processing 3338, San Diego, CA, Feb. 21-27, 1998, pp. 1127-1137.

James T Dobbins III and Devon J Godfrey, "Digital x-ray tomosynthesis : current state of the art and clinical potential", Phys. Med. Biol. 48 (2003) pp. R65-R106.

* cited by examiner

*Primary Examiner* — Samir Ahmed
*Assistant Examiner* — Ruiping Li

(57) ABSTRACT

A number of two-dimensional projection images of a three-dimensional examination object are assigned image times and imaging parameters. The projection images are combined into reconstruction groups including projection images with image times specifically assigned or within a time interval specific to the reconstruction groups. The reconstruction groups are determined in such a way that three-dimensional reconstructions of the examination object with direction-dependent local resolution can be determined based on the projection images of the reconstruction groups; it is not possible to determine three-dimensional reconstructions of the examination object with direction-independent local resolution. Three-dimensional reconstructions of the examination are determined based on the projection images of the reconstruction groups. Reconstruction times are determined based on the image times assigned to the projection images of the reconstruction groups and assigned to the three-dimensional reconstructions. Further analyses are performed as a function of the temporal sequence of the three-dimensional reconstructions.

19 Claims, 10 Drawing Sheets

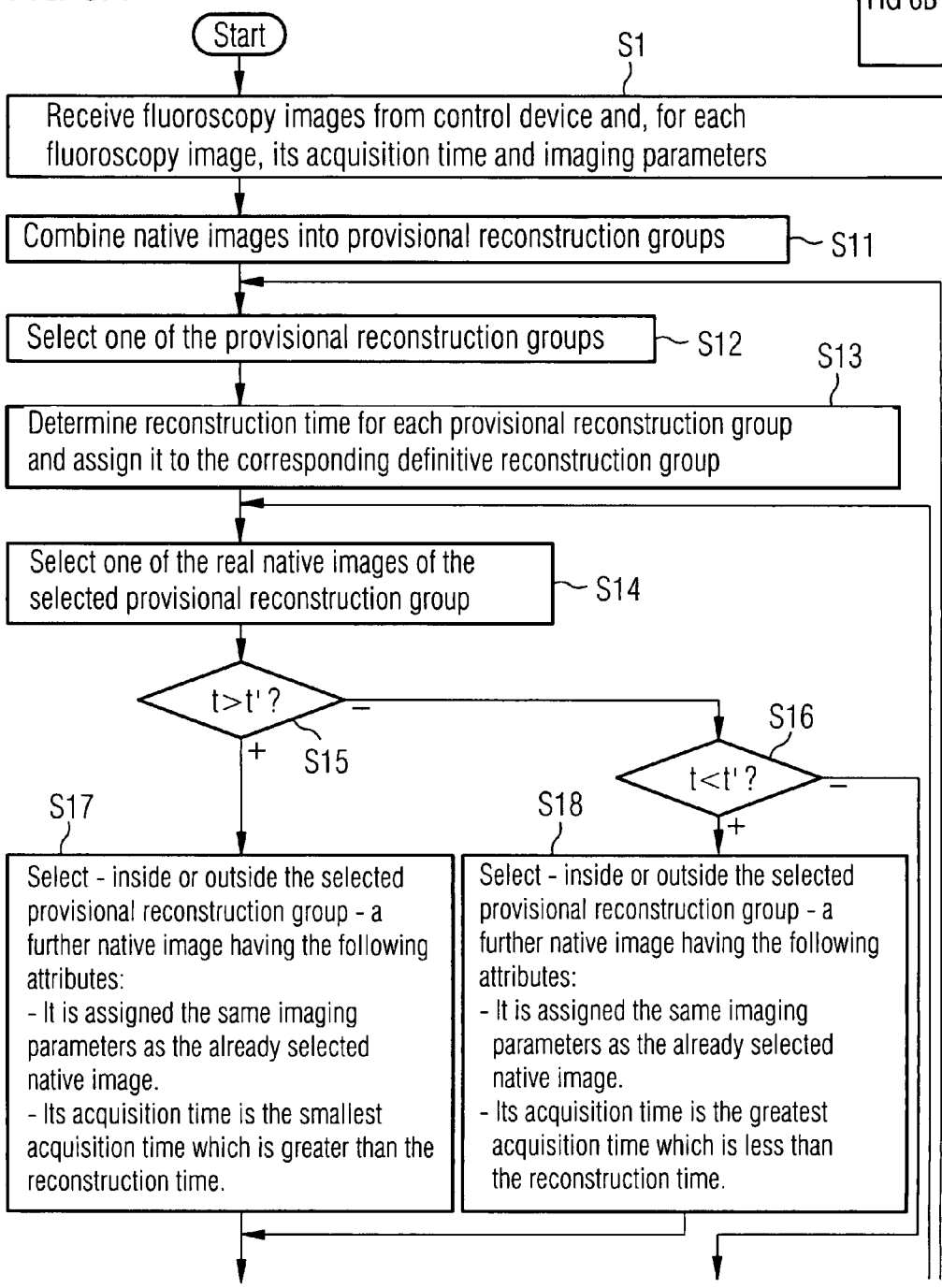

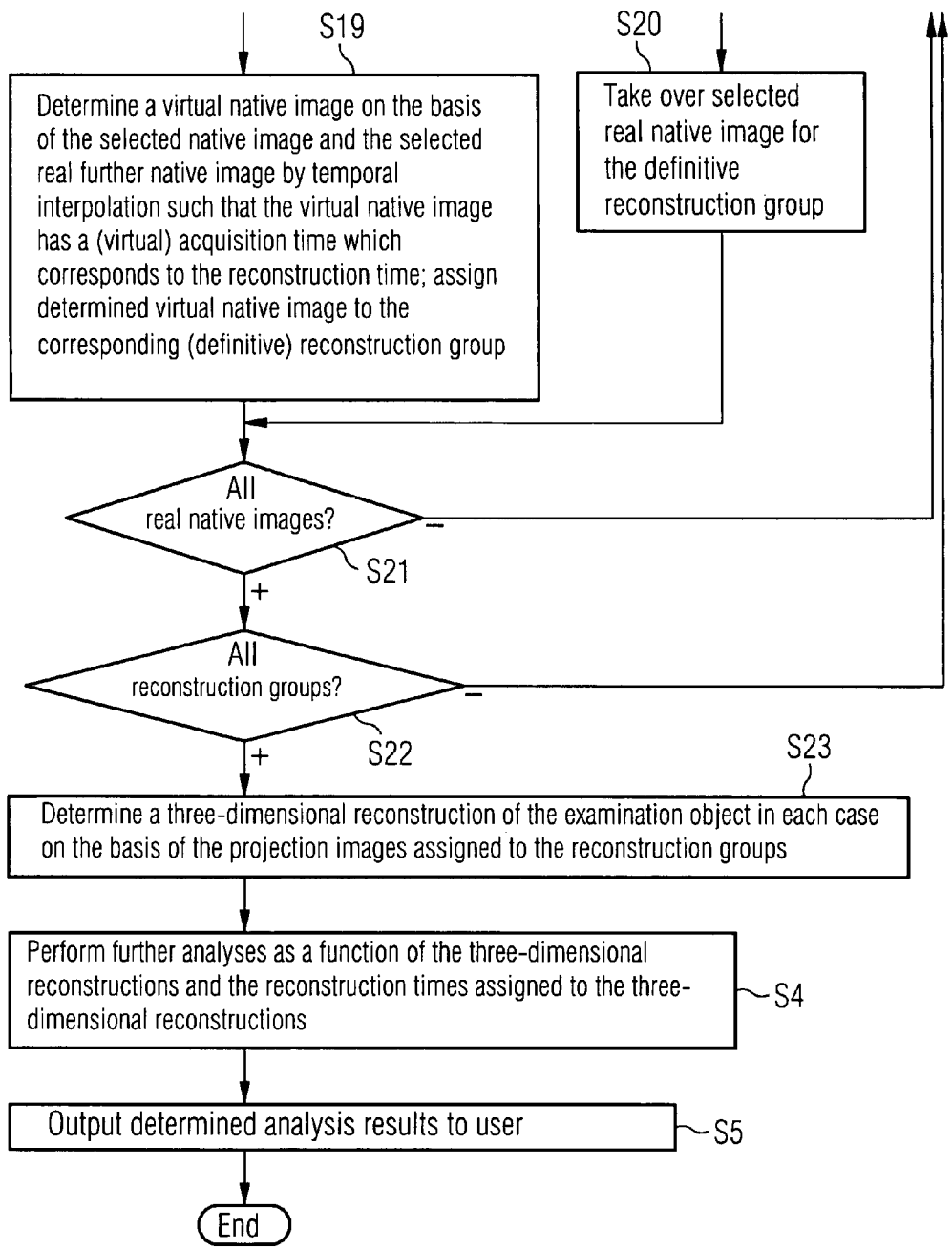

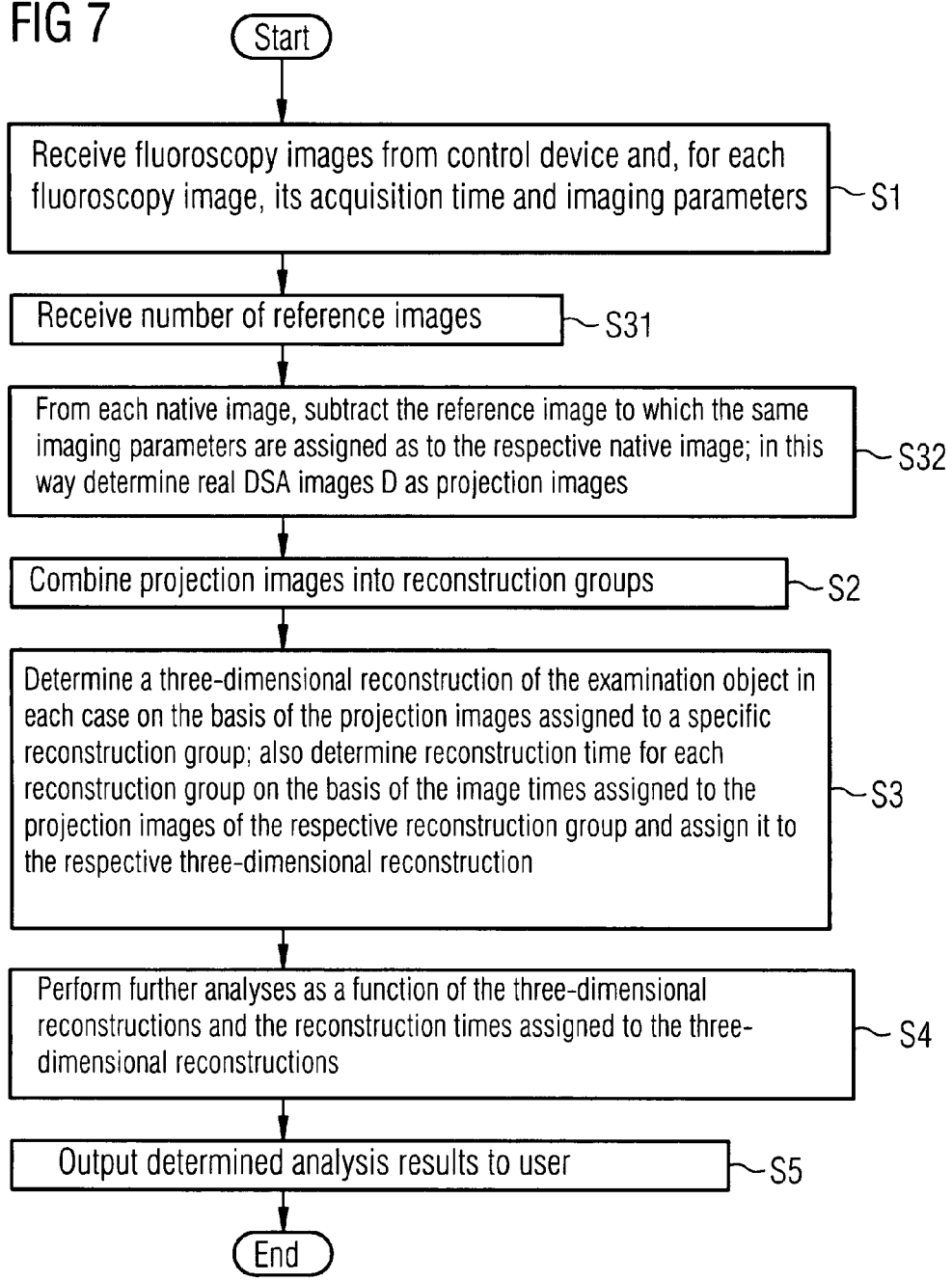

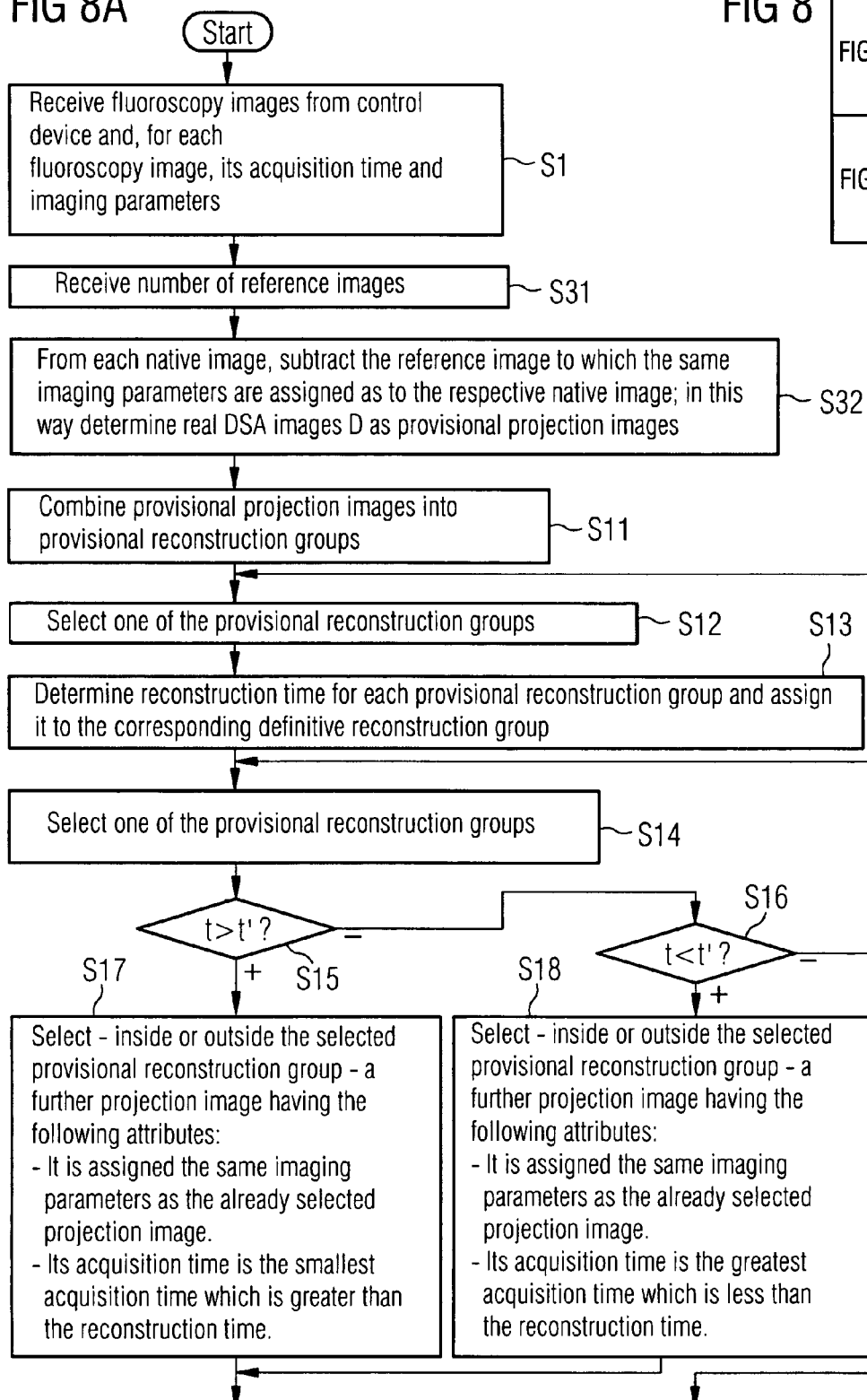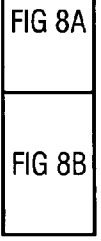

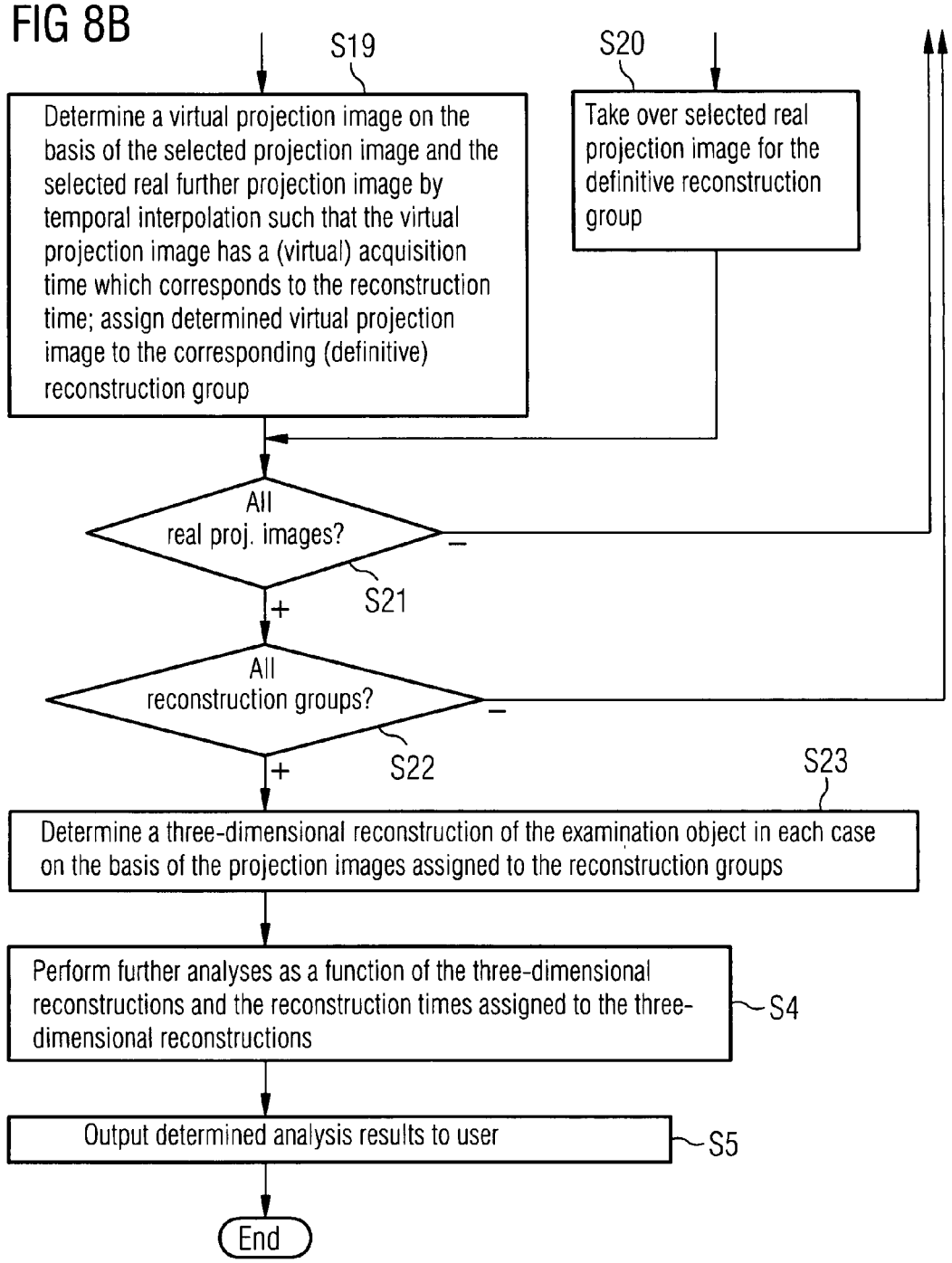

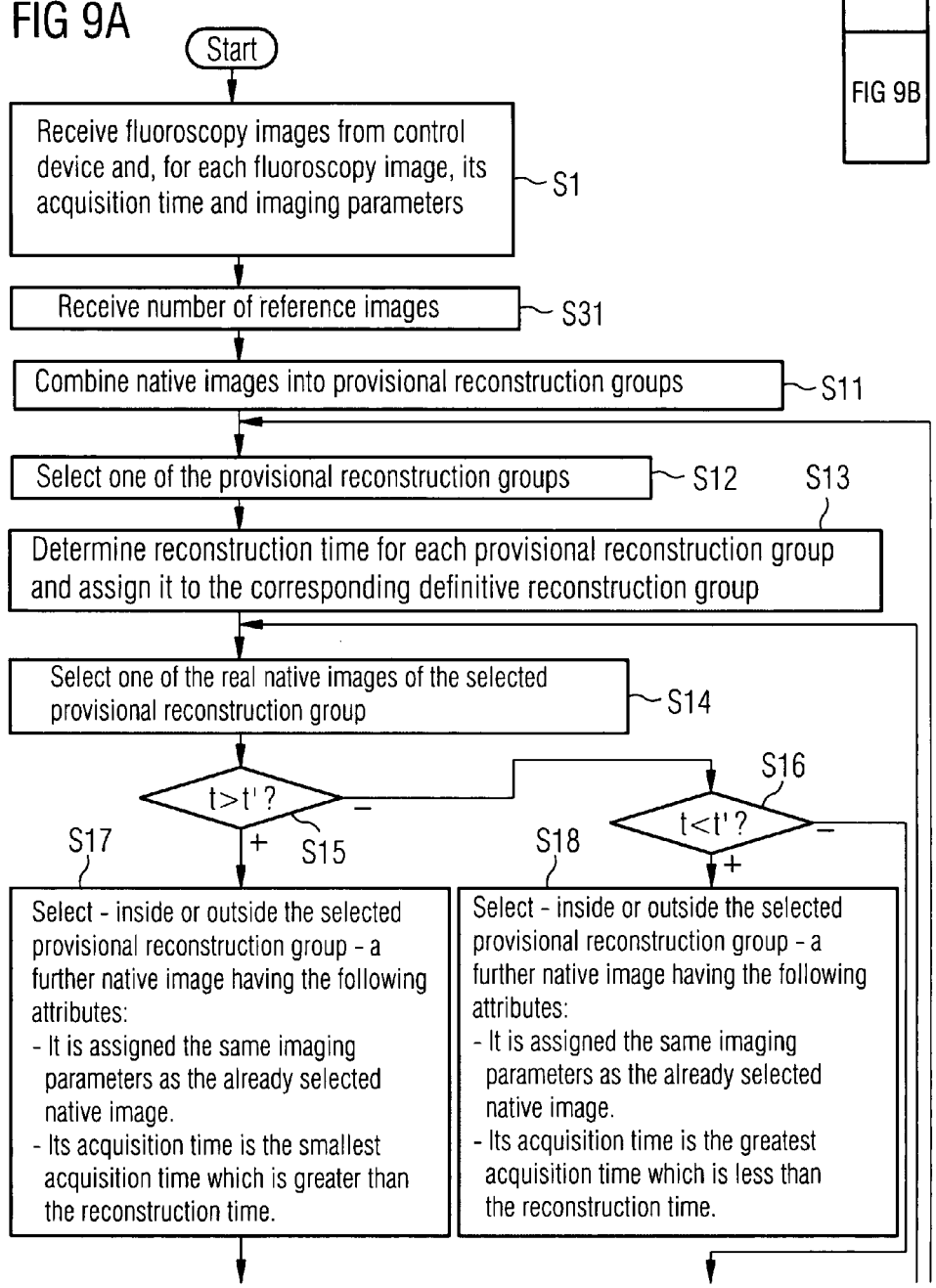

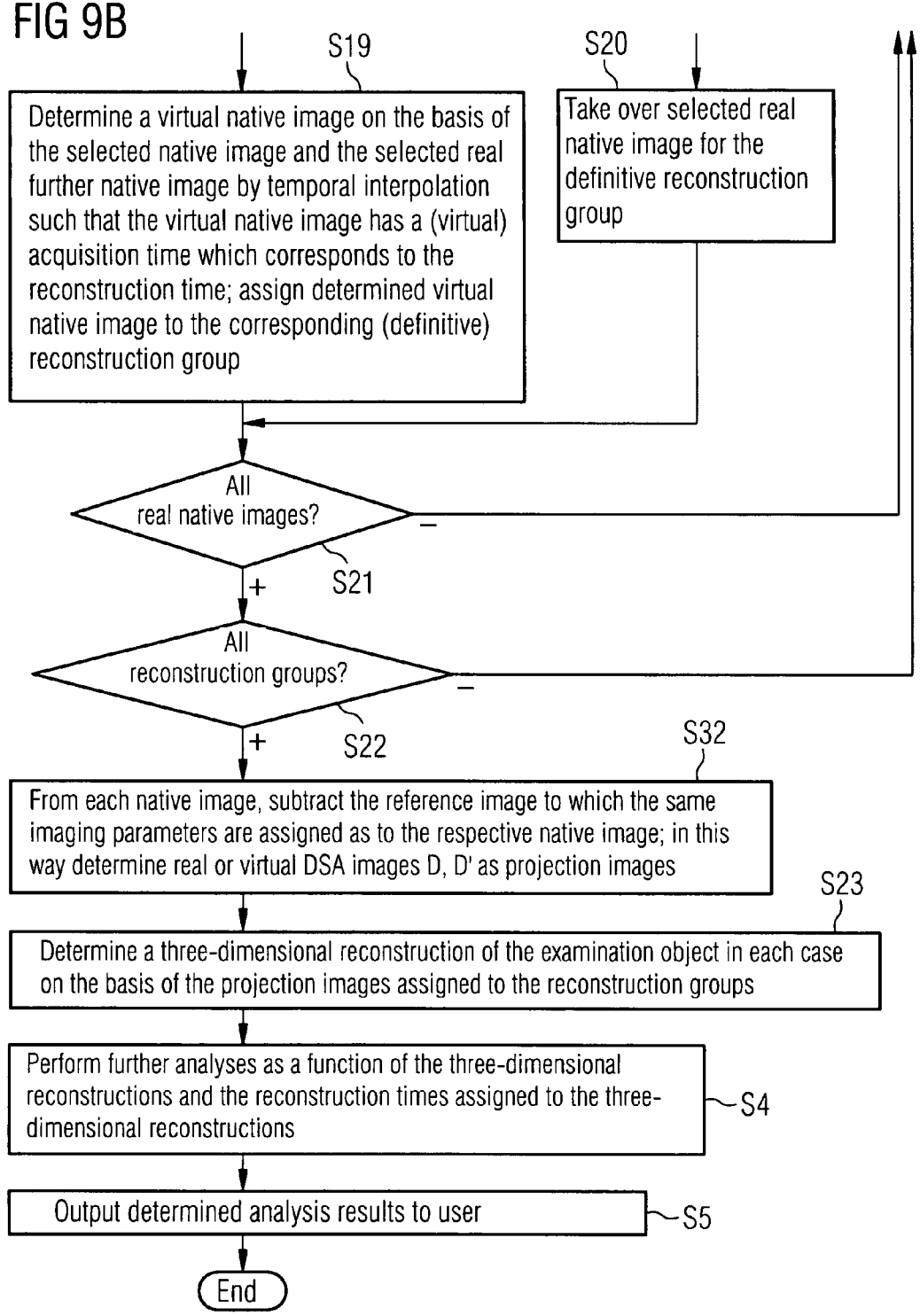

ANALYTICAL METHOD FOR A NUMBER OF TWO-DIMENSIONAL PROJECTION IMAGES OF A THREE-DIMENSIONAL EXAMINATION OBJECT

CROSS REFERENCE TO RELATED APPLICATIONS

This application claims priority of German application No. 10 2006 055 934.7 filed Nov. 27, 2006, which is incorporated by reference herein in its entirety.

FIELD OF THE INVENTION

The present invention relates to an analytical method for a number of two-dimensional projection images of a three-dimensional examination object, wherein each projection image is assigned an image time and imaging parameters, the image times corresponding in each case to a status of the examination object assumed at a specific moment in time and the imaging parameters describing how the three-dimensional space has been mapped into the respective projection image.

BACKGROUND OF THE INVENTION

It is known to combine the projection images into reconstruction groups in such a way that in the process each of the reconstruction groups includes all the projection images to which a specific one of the image times is assigned. Alternatively, each of the reconstruction groups includes all the projection images whose image times lie within a time interval specific to the respective reconstruction group. Each reconstruction group is defined in such a way that a three-dimensional reconstruction of the examination object with direction-independent local resolution can be determined on the basis of the projection images assigned to the respective reconstruction group. With regard to each reconstruction group, the respective three-dimensional reconstruction is determined. In addition, a reconstruction time is determined in each case on the basis of the image times assigned to the projection images of the respective reconstruction group and said time is assigned to the respective three-dimensional reconstruction. Further analyses are performed as a function of the temporal sequence of the three-dimensional reconstructions.

Analytical methods of this kind are usually performed using projection images which have been acquired by means of CT systems. In CT systems, a recording arrangement which comprises at least an X-ray source and an X-ray detector rotates at relatively high speed (currently up to 180 revolutions per minute) about a rotational axis. During the rotation the X-ray source and the X-ray detector are controlled and the projection images captured. The totality of captured projection images is subdivided into the reconstruction groups. For example, each reconstruction group can correspond to a complete revolution of the recording arrangement about the rotational axis. The corresponding three-dimensional reconstruction of the examination object is determined on the basis of the respective reconstruction group. The determined three-dimensional reconstruction has a direction-independent local resolution. The term "direction-independent local resolution" is to be understood in this context in the sense that the volume dataset has volume data elements which are localized in space by means of three coordinates of a Cartesian rectangular coordinate system. In this scheme each individual volume data element is embodied as a cube shape. In contrast thereto, the volume data element in the case of direction-dependent local resolution is embodied as a quadrangular shape.

The reconstruction time is, of course, assigned to the three-dimensional reconstructions in a meaningful way. For example, the average of the acquisition times of the corresponding projection images can be used. The further analyses comprise in particular functional medical evaluations, perfusion analyses for example. Other analyses are also possible, however.

In CT examinations, the examination space in which the examination object (typically a human being) is disposed is very constricted. Usually the examination object is not accessible from outside. If it is intended to perform interventions on the examination object, the examination object must be removed from the CT system. Only then can the intervention be performed. If further measurements are to be performed next, the examination object must be brought back into the examination space. Needless to say, the CT system must continue to be available.

Often a CT system is not available for image acquisition. In that case the image acquisition must be carried out using a conventional fluoroscopy apparatus, for example using a C-arm X-ray system.

In the case of C-arm X-ray systems too, the recording arrangement is usually movable. With many C-arm X-ray systems the recording arrangement can even be swiveled through 180° or more about an axis of rotation, with the result that the corresponding C-arm X-ray system can also be used to capture projection images on the basis of which—analogously to CT images—a three-dimensional reconstruction of the examination object can be determined which has a direction-independent local resolution.

With C-arm X-ray systems, however, the recording arrangement can be swiveled only relatively slowly. Depending on system, swiveling through, for example, 200° (more generally: 180° plus fan angle of the recording arrangement) takes at least four seconds, and considerably longer in many cases. This period of time is much too long for a multiplicity of possible—in particular medical—applications. In particular, for example, no three-dimensional perfusion sequences can be determined in this way.

In order to capture perfusion sequences using a C-arm X-ray system, in the prior art the recording arrangement is consequently positioned in advance and said positioning is maintained subsequently. Only on completion of the positioning is a sequence of two-dimensional projection images recorded. The further analysis is carried out on the basis of the two-dimensional projection images. A three-dimensional reconstruction is not determined and is also not possible with this approach. Only a DSA (DSA=Digital Subtraction Angiography) is possible.

An evaluation method for a number of two-dimensional projection images of a three-dimensional examination object is known from DE 103 54 214 A1. With said evaluation method, an image time and imaging parameters are assigned to each projection image. On the basis of the image times, a phase angle is determined in each case in conjunction with a phase signal of the examination object, said phase angle corresponding to a status of the examination object assumed at the respective time. The imaging parameters describe how the three-dimensional space has been mapped into the respective projection image. The projection images are combined into reconstruction groups. In this case each reconstruction group includes all the projection images that were captured within one and the same heart cycle within a predefined phase range. Based on the definition of the reconstruction groups, whereas a three-dimensional reconstruction of the examination object with direction-dependent local resolution can be determined on the basis of the projection images assigned to the respective reconstruction group, it is not on the other hand possible to determine a three-dimensional reconstruction of the examination object with direction-independent local resolution. With regard to each reconstruction group, the respective three-dimensional reconstruction of the examination object is determined. A plurality of three-dimensional reconstructions which originate from different heart cycles but are referred to the same phase range are combined with one another in suitable way in order thereby to obtain a CT section image, i.e. a three-dimensional reconstruction of the examination object with direction-independent local resolution.

SUMMARY OF THE INVENTION

The object of the present invention is to create a means of determining a temporal sequence of three-dimensional reconstructions of the examination object in which the time interval separating the three-dimensional reconstructions from one another is less than the time required to swivel the recording arrangement through a swivel angle which must be traversed in order to determine a three-dimensional reconstruction with direction-independent local resolution.

A further object of the present invention is to create a means of determining a temporal sequence of three-dimensional reconstructions of the examination object even in cases where although the recording arrangement is movable, due to constructional factors it cannot be swiveled through a sufficiently large swivel angle in order to determine a three-dimensional reconstruction of the examination object with direction-independent local resolution on the basis of the captured projection images.

The object is achieved by the claims.

According to the invention, each projection image is assigned an image time and imaging parameters. The image times correspond in each case to a status of the examination object assumed at a specific moment in time. The imaging parameters describe how the three-dimensional space has been mapped into the respective projection image. The projection images are combined into reconstruction groups. In this case each reconstruction group includes all the projection images to which a specific one of the image times is assigned. Alternatively each of the reconstruction groups includes all the projection images whose image times lie within a time interval specific to the respective reconstruction group. Each reconstruction group is defined in such a way that although a three-dimensional reconstruction of the examination object with direction-dependent local resolution can be determined on the basis of the projection images assigned to the respective reconstruction group, it is not possible on the other hand to determine a three-dimensional reconstruction of the examination object with direction-independent local resolution. With regard to each reconstruction group, the respective three-dimensional reconstruction is determined on the basis of the projection images assigned to the respective reconstruction group. A reconstruction time is determined in each case on the basis of the image times assigned to the projection images of the respective reconstruction group and said time is assigned to the three-dimensional reconstructions. Further analyses are performed as a function of the temporal sequence of the three-dimensional reconstructions.

Determining three-dimensional reconstructions with direction-dependent local resolution (tomosynthesis) is known per se to experts. It is explained for example in the technical article titled "Digital X-ray tomosynthesis: current state of the art and clinical potential" by James T. Dobbins III and Devon J. Godfrey, published in Phys. Med. Biol. 2003 Oct. 7, Volume 48, pages R65 to R106. Similar explanations can be found in the technical article "A theoretical framework for filtered backprojection in tomosynthesis" by Günter Lauritsch and Wolfgang H. Härer, published by K. M. Hanson, Medical Imaging 1998: Image Processing, Volume 3338, SPIE, pages 1127 to 1137. Methods of this kind are also described in the technical article "Optimizing filtered backprojection reconstruction for a breast tomosynthesis prototype device" by Thomas Mertelmeier et al., printed in Medical Imaging 2006, Physics of Medical Imaging, edited by Michael J. Flynn, Jiang Hsieh, Proceedings of SPIE, Volume 6142-15.

In the event that the recording arrangement by means of which the projection images are acquired can also be used to capture projection images on the basis of which a three-dimensional reconstruction with direction-independent local resolution can be determined, in contrast to the three-dimensional reconstruction with direction-independent local resolution, local resolution in one direction is "sacrificed" in order to gain time resolution. In the event that it is not possible due to design factors to use the recording arrangement by means of which the projection images were acquired to capture projection images on the basis of which a three-dimensional reconstruction with direction-independent local resolution can be determined, the determination of the sequence of three-dimensional reconstructions is made possible in the first place by the approach according to the invention.

In terms of programming measures, the object is achieved by means of a computer program comprising machine instructions which cause a computer to execute an analytical method of the above-described kind when the computer processes the machine instructions.

In terms of equipment, the object is achieved by means of a data medium and a computer, wherein a computer program of the aforesaid kind is stored in machine-readable form on the data medium or the computer program is stored in the computer and can be processed by the computer. In this case the computer can, where appropriate, be embodied as a control device for a fluoroscopy apparatus.

In the simplest case the projection images are native images acquired at acquisition times and the image times correspond to the acquisition times.

It is possible for the native images to be real native images. In this case, however, the three-dimensional reconstructions are usually prone to artifacts. The artifacts are caused here by the fact that the acquisition times of the projection images are not identical, but that the examination object constantly changes. The artifacts can be—at least partially—avoided if at least some of the native images are virtual native images which are determined by temporal interpolation of at least two real native images to which the same imaging parameters are assigned. In this case the virtual native images are determined in such a way that the acquisition times of the virtual native images within each reconstruction group match. The last-described approach is possible in particular when the temporal sequence of the real native images on the basis of which the respective virtual native image is determined satisfies the sampling theorem.

As an alternative to the use of (real and/or virtual) native images, it is possible for the projection images to be DSA images which are determined in each case by subtraction of a native image acquired at a respective acquisition time and a reference image, the same imaging parameters being assigned to the reference image as to the respective native image. In this case the image times correspond to the acquisition times.

Analogously to the native images, it is possible for the DSA images to be real DSA images, i.e. DSA images that were determined on the basis of real native images. Analogously to the native images, the three-dimensional reconstructions are in this case degraded by artifacts. The artifacts can be—at least partially—avoided if at least some of the DSA images are virtual DSA images that are determined by temporal interpolation of at least two real DSA images to which the same imaging parameters are assigned. In this case the virtual DSA images are determined in such a way that the image times of the virtual DSA images within each reconstruction group match.

Alternatively hereto, artifacts can also be reduced or avoided if at least some of the native images are virtual native images which are determined by temporal interpolation of two real native images to which the same imaging parameters are assigned. In this case the virtual native images are determined in such a way that the acquisition times of the virtual native images within each reconstruction group match. In this case the DSA images are determined on the basis of the virtual native images and the reference images.

It is possible to evaluate the three-dimensional reconstructions as such, that is to say without recourse to further image or volume information associated with the examination object. In many cases, however, it will lead to better results if the three-dimensional reconstructions are registered relative to a volume dataset of the examination object, the volume dataset having a direction-independent local resolution. In this case the volume dataset is taken into account in the further analyses. Preferably the volume dataset has a local resolution which is at least as high as the best local resolution of the three-dimensional reconstructions.

It is possible to perform global analyses of the three-dimensional reconstructions. Usually, however, the further analyses are performed in a locally resolved manner, in particular in a three-dimensionally locally resolved manner.

Depending on the type of data acquisition, the local resolution of the three-dimensional reconstructions can be collectively the same. Alternatively, however, it is possible for the local resolution of the three-dimensional reconstructions to be different from three-dimensional reconstruction to three-dimensional reconstruction.

BRIEF DESCRIPTION OF THE DRAWINGS

Further advantages and details will emerge from the following description of exemplary embodiments in conjunction with the drawings, in which:

FIGS. 2 to 4 show possible travel movements of a recording arrangement and FIGS. 5 to 10 are flowcharts.

DETAILED DESCRIPTION OF THE INVENTION

Figure 1:
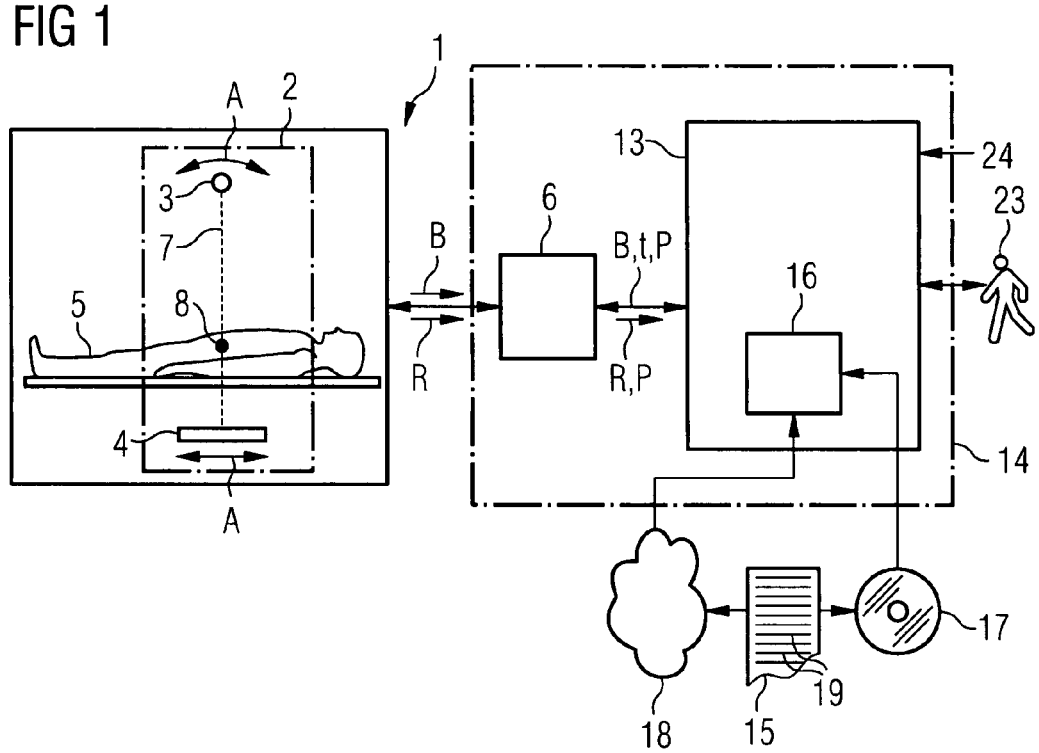
FIG. 1 shows a schematic representation of a fluoroscopy apparatus and a computer.

According to FIG. 1, a fluoroscopy apparatus 1 is embodied as an X-ray system. The fluoroscopy apparatus 1 has a recording arrangement 2 which includes an X-ray source 3 and a two-dimensional X-ray detector 4. Owing to the two-dimensionality of the X-ray detector 4, the X-ray detector 4 captures two-dimensional fluoroscopy images B of an examination object 5 (for example a human being 5) and supplies them to a control device 6 for the recording arrangement 2 when it is controlled accordingly by the control device 6. The control device 6 buffers the fluoroscopy images B that are supplied to it. At the same time it assigns inter alia their acquisition time t to the stored fluoroscopy images B.

The examination object 5—or the relevant part of the examination object 5—changes over time. For example, a contrast agent is injected into a vascular system of the examination object 5, is then absorbed into the tissue surrounding the vascular system, and finally is washed out of the tissue. The respective acquisition time t therefore corresponds to the respective status of the examination object 5 which the examination object 5 has assumed at said time t.

The embodiment of the fluoroscopy apparatus 1 as an X-ray machine represents a typical embodiment of the fluoroscopy apparatus 1. Alternative embodiments are possible, however. In particular, the fluoroscopy apparatus 1 could have a gamma emitter as the radiation source instead of the X-ray source 3.

The control device 6 usually controls the recording arrangement 2 in such a way that the X-ray source 3 (and in most cases also the X-ray detector 4) is moved during the acquisition of the fluoroscopy images B. This is indicated in FIG. 1 by corresponding double arrows A. With regard to each fluoroscopy image B, the three-dimensional space is therefore mapped into the respective fluoroscopy image B in a way which varies from fluoroscopy image B to fluoroscopy image B. The manner in which the three-dimensional space is mapped into the respective fluoroscopy image B can be described by means of imaging parameters P. The imaging parameters P are known to the control device 6 because the positioning of the recording arrangement 2 is effected by means of said control device 6. The control device 6 can therefore also assign the respective imaging parameters P to the captured fluoroscopy images B in addition to the acquisition times t.

Figure 2:
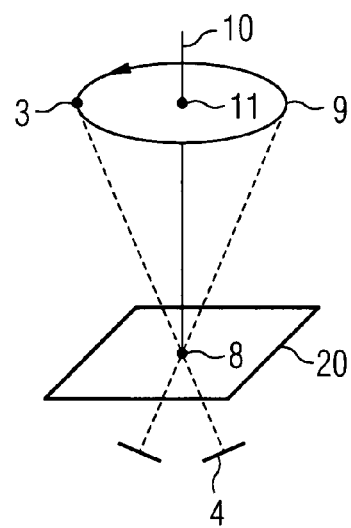
Figure 3:
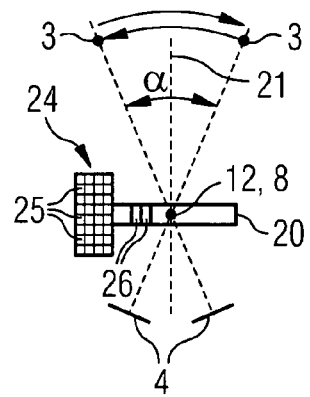
Figure 4:
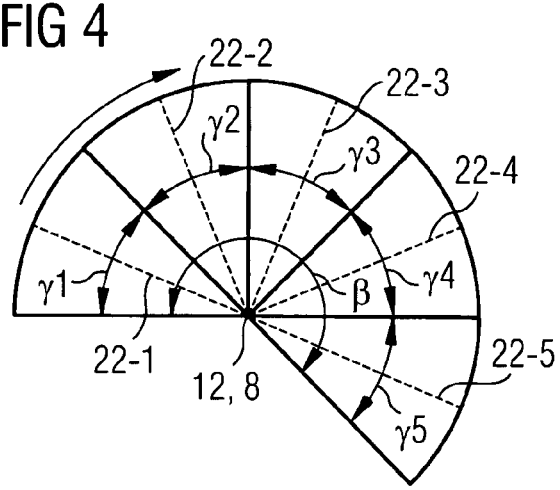

FIGS. 2 to 4 show typical possible travel movements of the X-ray source 3. The X-ray detector 4 is usually moved correspondingly, with the result that a connecting line 7 from the X-ray source 3 to the X-ray detector 4 always includes a predefined point 8 (pivotal point or axis of rotation) irrespective of the actual positioning of the recording arrangement 2. Alternatively, however, other travel movements are also possible. In particular, as an alternative to the swivel movements and rotations shown in FIGS. 2 to 4, X-ray source 3 and X-ray detector 4 can also perform a linear movement. Alternatively, linear movements of this kind can be in opposite directions or in the same direction. The positioning of the X-ray detector 4 can also be retained. Furthermore, the X-ray detector 4 is in fact preferably oriented orthogonally to the connecting line 7. This is not absolutely essential, however.

According to FIG. 2, for example, the X-ray source 3 is moved along a circle 9 about an axis of rotation 10. In this case the X-ray source 3 performs a plurality of complete revolutions about the axis of rotation 10. Many fluoroscopy images B, typically 20 to 200 fluoroscopy images B, are acquired per revolution.

The circle 9 has a center 11 which lies on the axis of rotation 10. The axis of rotation 10 stands orthogonally on the plane defined by the circle 9. The X-ray detector 4 is moved correspondingly, as shown in FIG. 2. The examination object 5 is preferably positioned in such a way that the relevant part of the examination object 5 is disposed as close as possible to the predefined point 8.

Alternatively, the X-ray source 3 according to FIG. 3 can be swiveled for example about an axis of rotation 12. According to FIG. 3 the swiveling travel takes place over an angular range α which is typically considerably less than 180°, lying for example between 30° and 60°. It is assumed by way of example below that the angular range α is 40°. As can be seen from FIG. 3, the X-ray source 3 is swiveled about the axis of rotation 12 first in a clockwise direction and then in an anticlockwise direction, then again in a clockwise direction, etc. Preferably the fluoroscopy images B are acquired both when the X-ray source 3 is swiveled in a clockwise direction and when the X-ray source 3 is swiveled in an anticlockwise direction. Alternatively it would also be possible, however, to acquire the fluoroscopy images B only while the X-ray source 3 is being swiveled in the clockwise direction or only while the X-ray source 3 is being swiveled in the anticlockwise direction. However, in all three cases the fluoroscopy images B are acquired in close succession, for example after every swiveling action through 1° (or 0.5° or 1.5° or 2° or . . . ).

Alternatively it is possible, according to FIG. 4, to swivel the X-ray source 3 over an angular range β which is in the order of 180°, in particular is even more than 180°. It is shown by way of example in FIG. 4 that the angular range β is 200°. Analogously to FIG. 3, in the embodiment according to FIG. 4 also, a fluoroscopy image B of the examination object 5 is acquired in close angular increments (for example after every 0.5° or after every 1.0°). If the examination object 5 were static, the fluoroscopy images B acquired in the course of the swiveling action of FIG. 4 could be used for example as a basis for determining a volume dataset of the examination object 5 which has a direction-independent local resolution. In the travel movements of the X-ray source 3 according to FIGS. 2 and 3, on the other hand, this is essentially not possible.

In the embodiments according to FIGS. 3 and 4 also, the X-ray detector 4 is preferably swiveled in such a way that the connecting line 7 from the X-ray source 3 to the X-ray detector 4 always includes the axis of rotation 12. The examination object 5 is preferably positioned such that the relevant part of the examination object 5 is disposed as close as possible to the axis of rotation 12.

The control device 6 transmits the fluoroscopy images B supplied to it and the data assigned to the fluoroscopy images B t, P (acquisition times t and imaging parameters P) to a computer 13. Usually the computer 13 is separate from the control device 6. In this case a true data communications transmission takes place. However, it is also possible for the computer 13 and the control device 6 to form a common unit 14. This case is indicated by the dash-dotted line in FIG. 1. In this case the computer 13 is embodied as a control device 6 for the fluoroscopy apparatus 1.

A computer program 15 is stored in the computer 13. More particularly, the computer program 15 can be stored in a mass storage medium 16 of the computer 13, for example on a hard disk. The computer program 15 is supplied to the computer 13 for example by way of a mobile data medium 17 (CD-ROM, USB stick, memory card, . . . ) on which the computer program 15 is stored. Alternatively the computer program 15 could be supplied to the computer 13 for example via a network connection 18.

The computer program 15 can be processed by the computer 13. It comprises machine instructions 19. When the computer 13 processes the machine instructions 19, the execution of the machine instructions 19 causes the computer 13 to perform an analytical method which is explained in more detail below in conjunction with FIG. 5.

Figure 5:
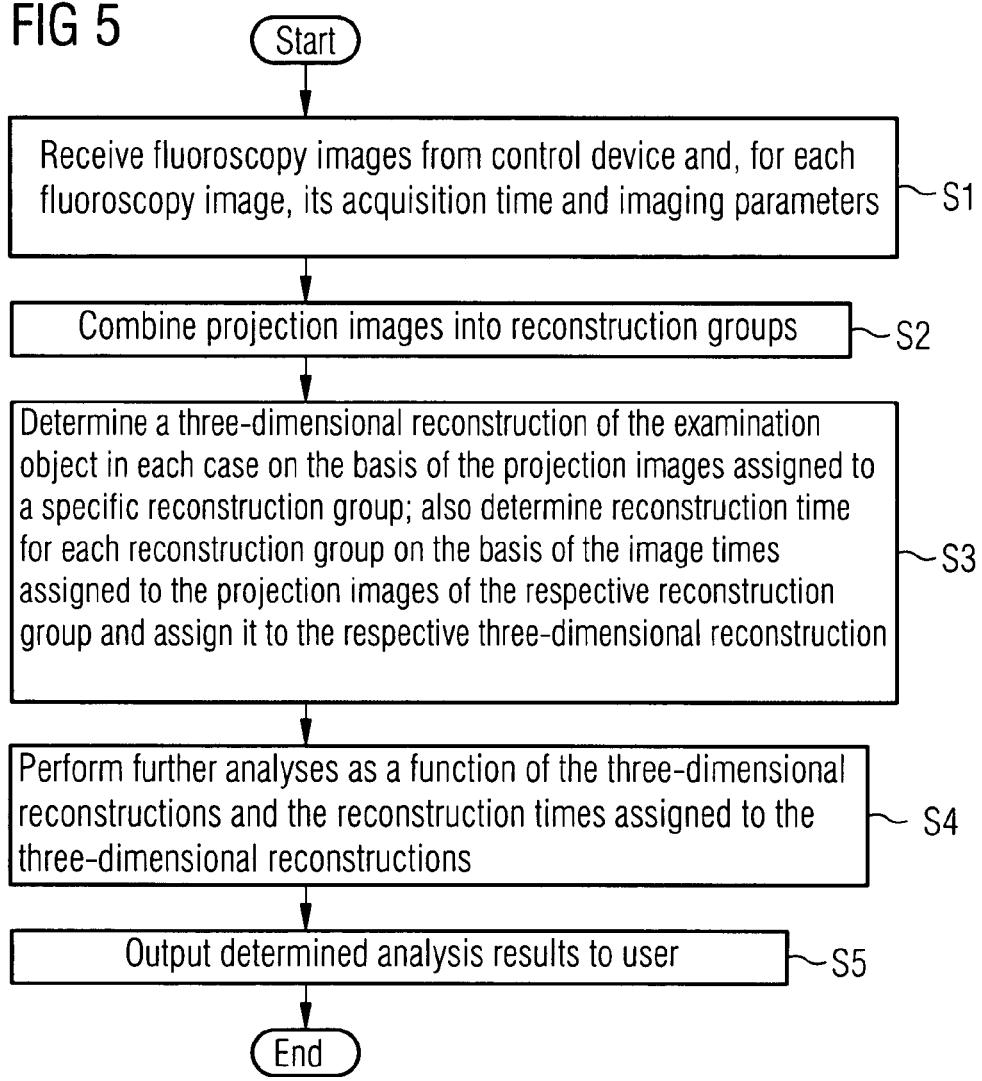

According to FIG. 5, in a step S1 the computer 13 receives the fluoroscopy images B and, for each fluoroscopy image B, its acquisition time t and its imaging parameters P from the control device 6. The fluoroscopy images B are real native images, i.e. actually recorded images. In the embodiment of the present invention described in conjunction with FIG. 5, they represent projection images within the meaning of the present invention. Furthermore, the acquisition times t of the native images B in the context of FIG. 5 correspond to image times t of the projection images B. In the following description, therefore, the fluoroscopy or native images B will always be referred to as projection images B in connection with FIG. 5. The projection images B could, however, also be other than actually recorded native images B. This will be explained later in connection with FIGS. 6 to 9.

In a step S2, the computer 13 combines the projection images B into reconstruction groups G. If the X-ray source 3 was moved during the acquisition of the projection images B according to the illustration in FIG. 2, the projection images B that were captured, for example, during the first, second, third etc. revolution of the X-ray source 3 about the axis of rotation 10 can be combined in each case into a reconstruction group G. Alternatively, for example, the projection images B that were captured during the first revolution of the X-ray source 3 about the axis of rotation 10, during the second half of the first revolution and the first half of the second revolution of the X-ray source 3 about the axis of rotation 10, during the second revolution of the X-ray source 3 about the axis of rotation 10, etc. can in each case be combined into a reconstruction group G.

If the X-ray source 3 was moved during the acquisition of the projection images B according to the illustration in FIG. 3, the projection images B that were captured, for example, during the first swiveling action in a clockwise direction, during the first swiveling action in an anticlockwise direction, during the second swiveling action in the clockwise direction, etc. can in each case be combined into a reconstruction group G.

If the X-ray source 3 was moved during the acquisition of the projection images B according to the illustration in FIG. 4, the projection images B that were captured, for example, in a first, a second, a third etc. partial angular range γ1, γ2, γ3, . . . of the angular range β of FIG. 4 can be combined in each case into a reconstruction group G. Analogously to the procedure outlined above in connection with FIG. 2, temporally overlapping reconstruction groups G can also be defined during the acquisition of the projection images B according to the illustration in FIG. 4. For example, the second half of the partial angular range γ1 could be combined with the first half of the partial angular range γ2 to form a new partial angular range.

Owing to the above-described manner in which the projection images B are combined into reconstruction groups G, the reconstruction groups G define temporally contiguous time intervals. Thus, if $tmin_i$ and $tmax_i$ denote the minimum and maximum of the image times t of the projection images B of the respective reconstruction group $G_i$, it holds that: Each projection image B whose image time t lies between the times $tmin_i$ and $tmax_i$ is assigned to the respective reconstruction group $G_i$.

Owing to the above-described manner in which the projection images B are combined into reconstruction groups G, it is also possible to determine a three-dimensional reconstruction of the examination object 5 in each case on the basis of the projection images B which are assigned to a specific reconstruction group G. Said determining takes place—separately for each reconstruction group G—in a step S3. However, the three-dimensional reconstructions exhibit a direction-dependent local resolution, not a direction-independent local resolution. In particular the three-dimensional reconstructions have a relatively high local resolution in one plane 20—see FIGS. 2, 3 and 4—and a relatively low local resolution in a direction orthogonal hereto. Determining a three-dimensional reconstruction with a direction-independent local resolution, on the other hand, is not possible.

As a matter of form it should be pointed out that the terms "direction-dependent local resolution" and "direction-independent local resolution" refer to resolutions that are possible as a maximum based on the projection images B on which the respective reconstruction is based, in conjunction with the sampling theorem. For it is, of course, always possible, by combining or subdividing volume elements, to determine a reconstruction with direction-independent local resolution on the basis of a reconstruction with direction-dependent local resolution or, as the case may be, to determine a reconstruction with direction-dependent local resolution on the basis of a reconstruction with direction-independent local resolution.

In the course of step S3 the computer 13 also determines a reconstruction time t' for each reconstruction group G on the basis of the image times t assigned to the projection images B of the respective reconstruction group G. The computer 13 assigns the reconstruction time t' to the respective three-dimensional reconstruction G. For example, the computer 13 can determine the average value from the above-defined times $tmin_i$ and $tmax_i$ for the respective reconstruction group $G_i$ and define it as the reconstruction time t'. Other meaningful values are also possible. They should preferably lie between the above-defined times $tmin_i$ and $tmax_i$.

The direction in which the local resolution is lower than in the plane 20 is determined by the travel movement of the X-ray source 3 during the acquisition of the fluoroscopy images B. With regard to the image acquisition according to FIG. 2, the orthogonal direction is oriented for example parallel to the axis of rotation 10. With regard to the image acquisition according to FIG. 3, the orthogonal direction is oriented parallel to the angle bisector 21 of the angular range α of FIG. 3. With regard to the image acquisition according to FIG. 4, the orthogonal direction is in each case oriented parallel to the angle bisector 22-1, 22-2 etc. of the respective partial angular range γ1, γ2 etc.

Based on the above remarks it is clear that in the case of an image acquisition according to FIG. 2 and an image acquisition according to FIG. 3 the local resolution of the three-dimensional reconstructions collectively is identical. In the case of an image acquisition according to FIG. 4, on the other hand, the local resolution of the three-dimensional reconstructions is different from three-dimensional reconstruction to three-dimensional reconstruction.

In a step S4, the computer 13 performs further analyses as a function of the three-dimensional reconstructions and the reconstruction times t' assigned to the three-dimensional reconstructions—in particular as a function of the temporal sequence of the three-dimensional reconstruction. For example, perfusion analyses and suchlike can be carried out. The computer 13 performs the analyses preferably in a locally resolved manner. Also conceivable, however, are global analyses which are determined for example by integration by way of the location. When locally resolved analyses are performed, the analysis can, in the individual case, be one-dimensionally or two-dimensionally locally resolved. Usually, however, the analysis will be performed in a three-dimensionally locally resolved manner.

In a step S5, the computer 13 outputs the analysis results determined in step S4—for example a color-coded image—to a user 23.

The computer 13 performs the analytical method of FIG. 5 essentially automatically. In particular, steps S1 to S5 as such are performed automatically by the computer 13. Only parameters required for execution of steps S1 to S5 are specified where necessary by the user 23.

Figure 10:
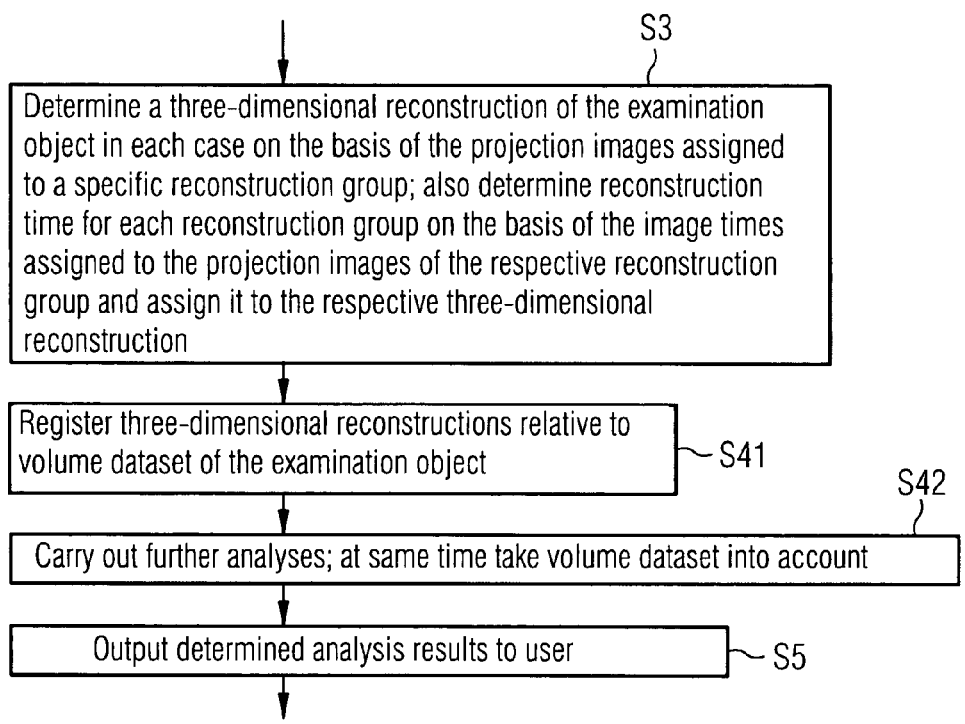

Possible embodiments and variations of the procedure of FIG. 5 are explained below in connection with FIGS. 6 to 10. In this case FIGS. 6 to 9 each show an alternative embodiment for determining the projection images B. FIG. 10 shows a modification of the analysis of the three-dimensional reconstructions.

In the embodiment according to FIG. 6, the analytical method according to the invention also includes the steps S1, S4 and S5. No explanations are therefore necessary in respect of these steps. Instead of steps S2 and S3 from FIG. 5, however, FIG. 6 has steps S11 to S23. Steps S11 to S23 are explained in more detail below.

According to FIG. 6, in step S11 the computer 13 combines the native images B into provisional reconstruction groups G'. Except for the fact that the reconstruction groups G' of step S11 are only provisional reconstruction groups G', step S11 essentially corresponds to step S2 from FIG. 5.

In step S12 the computer 13 selects one of the provisional reconstruction groups G'. In this case the selection can if necessary be made in such a way that the temporally first and the temporally last provisional reconstruction group G' cannot be selected in the course of step S12.

In step S13 the computer 13 determines—analogously to step S3 from FIG. 5—the reconstruction time t' for each provisional reconstruction group G'. In the course of step S13 the computer 13 assigns the reconstruction time t' to the corresponding (definitive) reconstruction group G.

In step S14 the computer 13 selects one of the real native images B of the provisional reconstruction group G' selected in step S12. In steps S15 and S16 the computer 13 compares the real acquisition time t of the real native image B selected in step S14 with the reconstruction time t' determined in step S13. Depending on the result of the comparison, the computer 13 next performs steps S17 and S19, steps S18 and S19, or step S20.

In step S17 the computer 13 selects—either inside or outside the provisional reconstruction group G' selected in step S12—a native image B. Said native image B is defined by having the following attributes:

It is assigned the same imaging parameters P as the native image B already selected in step S14.

The acquisition time t assigned to the native image B that is now to be selected is the smallest acquisition time t which is greater than the reconstruction time t'.

In an analogous manner a native image B is also selected in step S18 either inside or outside the provisional reconstruction group G' selected in the course of step S12. In this case too, the same imaging parameters P are assigned to the native image B as to the native image B selected in the course of step S14. However, the acquisition time t of the native image B that is to be selected in the course of step S18 is the greatest acquisition time t which is less than the reconstruction time t'.

In the course of step S19 the computer 13 determines a virtual native image B' on the basis of the real native image B selected in step S14 and the real native image B selected in the course of step S17 or S18. It determines the virtual native image B' by temporal interpolation of the two selected real native images B. The virtual native image B' is determined in the course of step S19 in such a way that the virtual native image B' has a (virtual) acquisition time t' which corresponds to the reconstruction time t'. The computer 13 assigns the determined virtual native image B'—likewise in the course of step S19—to the corresponding (definitive) reconstruction group G.

In the course of step S20 the computer 13 takes over the real native image B selected in step S14 for the definitive reconstruction group G.

In the course of steps S15 to S20 a linear interpolation takes place in the simplest case. However, if more than two real native images B are drawn upon in the course of steps S17 to S19, more complex interpolation schemes are also possible alternatively.

The procedure according to FIG. 6 is beneficial in particular when the examination object 5 changes so slowly that the time intervals between the real native images B satisfy the sampling theorem.

In the course of the procedure of FIG. 6, the acquisition times t' of the real and virtual native images B, B' match, for they always have the value of the corresponding reconstruction times t'. In the procedure according to FIG. 6 the reconstruction groups G therefore define times t' that are pair wise different from one another.

In step S21 the computer 13 checks whether it has already determined a corresponding native image B, B' of the corresponding definitive reconstruction group G for each real native image B of the provisional reconstruction group G' selected in step S12. If this is not the case, the computer 13 returns to step S14 and selects another real native image B of the currently selected provisional reconstruction group G'. Otherwise it proceeds to step S22.

In step S22 the computer 13 checks whether it has already determined all definitive reconstruction groups G. If this is not the case, the computer 13 returns to step S12 and selects another provisional reconstruction group G'. Otherwise the computer 13 proceeds to step S23.

In step S23 the computer 13 determines—analogously to step S3 from FIG. 5—a three-dimensional reconstruction of the examination object 5 in each case on the basis of the virtual and/or real projection images B, B' assigned to the reconstruction groups G.

The procedure according to FIG. 7 also essentially corresponds to the procedure from FIG. 5. In contrast to the procedure from FIG. 5, however, in the procedure of FIG. 7 steps S31 and S32 are inserted after step S1.

In step S31 the computer 13 receives a number of reference images R. In this case, for each native image B received in step S1, a reference image R is present to which the same imaging parameters P are assigned as to the respective native image B.

In step S32 the computer 13 subtracts from each native image B the reference image R to which the same imaging parameters P are assigned as to the respective native image B. In this way the computer 13 determines real DSA images D as projection images D. The image times t of the projection images D also correspond to the acquisition times t at which the native images B were captured.

In FIGS. 8 and 9, the procedures of FIGS. 6 and 7 are combined. The essential difference between FIGS. 8 and 9 basically consists in the order in which the steps are performed. In the procedure according to FIG. 8—analogously to the procedure of FIG. 7—the real DSA images D are determined first and then—analogously to the procedure of FIG. 6—virtual DSA images D' are determined on the basis of the real DSA images D. With the procedure according to FIG. 9, on the other hand, the virtual native images B' are determined first—analogously to the procedure from FIG. 6—on the basis of the real native images B. Only after this—analogously to the procedure from FIG. 7—are the virtual DSA images D' determined on the basis of the virtual native images B' and the reference images R.

FIG. 10 shows a possible embodiment of step S4 of FIGS. 5 to 9. According to FIG. 10, step S4 is subdivided into steps S41 and S42.

In step S41 the computer 13 registers the three-dimensional reconstructions relative to a volume dataset 24 of the examination object 5. In this case the volume dataset 24 can be made available to the computer 13 in a variety of ways. It is possible, for example, that the volume dataset 24 has been determined elsewhere and supplied to the computer 13 as a finished volume dataset 24. Alternatively it is equally possible for the computer 13 to be supplied with a number of two-dimensional native images on the basis of which the computer 13 automatically determines the volume dataset 24. It is even possible for the last-mentioned two-dimensional native images—before or after the acquisition of the native images B on the basis of which the analyses of FIGS. 5 to 9 are performed—to be captured using the same fluoroscopy apparatus 1 by means of which the two-dimensional native images B are captured on which the projection images B, B', D, D' are based.

In step S42—analogously to step S4 from FIG. 5—the computer 13 performs further analyses. In contrast to step S4 from FIG. 5, however, in the course of step S42 the computer 13 takes the volume dataset 24 into account during the further analyses. For example, some of the three-dimensional reconstructions can be excluded from the analyses on the basis of the volume dataset 24. Alternatively or in addition, a correction of the location assignment is possible on the basis of the volume dataset 24.

Typically, the volume dataset 24 has a direction-independent local resolution. In particular the local resolution of the volume dataset 24 is usually at least as high as the best local resolution of the three-dimensional reconstructions. This is indicated by way of example in FIG. 3 by individual volume elements 25 of the volume dataset 24 in FIG. 3 being represented as small squares, whereas individual volume elements 26 of the three-dimensional reconstruction in FIG. 3 are represented as rectangles in which the length of the short sides corresponds to the edge length of the small squares.

Using the analytical method according to the invention and the corresponding program and equipment-related objects (computer program 15, data medium 17, computer 13) it is possible to perform three-dimensional reconstructions and analyses of the examination object 5 based on said reconstructions, although the data acquisition does not allow a complete determination of a three-dimensional reconstruction, that is to say a three-dimensional reconstruction with direction-independent local resolution. In particular, three-dimensional reconstructions can be determined and an analysis of the reconstructions based hereon made possible even when the two-dimensional projection images B, B', D, D' on which the three-dimensional reconstructions are based are captured using a C-arm X-ray system and suchlike. This applies quite particularly when the X-ray system is modified in such a way that the X-ray source 3 and/or the X-ray detector 4 is/are moved by means of robotic arms.

The above description serves solely to explain the present invention. The scope of protection of the present invention, on the other hand, is to be defined exclusively by the attached claims.

The invention claimed is:

1. A method for analyzing a plurality of two-dimensional projection images of a three-dimensional examination object, comprising:
    assigning a plurality of image times and imaging parameters to the projection images by a computer, wherein each of the image times corresponds to an acquisition time when a respective project image is captured;

combining the projection images into a plurality of reconstruction groups based on the assigned image times by the computer;

determining a plurality of three-dimensional reconstructions of the examination object based on the projection images assigned to the reconstruction groups by the computer;

determining a plurality of reconstruction times based on the image times assigned to the projection images in the reconstruction groups by the computer;

assigning the reconstruction times to the three-dimensional reconstructions for generating a temporal sequence of the three-dimensional reconstructions by the computer; and analyzing the projection images as a function of the temporal sequence of the three-dimensional reconstructions by the computer, wherein the projection images are digital subtraction angiography images that are determined by subtracting native images captured at acquisition times with reference images assigned identical imaging parameters with the native images and the image times of the digital subtraction angiography images correspond to the acquisition times.

2. The method as claimed in claim 1, wherein the projection images are native images captured at acquisition times and the image times correspond to the acquisition times.

3. The method as claimed in claim 2, wherein at least some of the native images are virtual native images that are determined by a temporal interpolation of at least two captured native images and assigned to identical imaging parameters of the captured native images, and wherein acquisition times of the virtual native images match with each other within the reconstruction groups.

4. The method as claimed in claim 1, wherein at least some of the digital subtraction angiography images are virtual digital subtraction angiography images, wherein the virtual digital subtraction angiography images are determined by a temporal interpolation of at least two real digital subtraction angiography images and assigned identical imaging parameters of the real digital subtraction angiography images, wherein the real digital subtraction angiography images are determined by real native images, and wherein the image times of the virtual digital subtraction angiography images match with each other within the reconstruction groups.

5. The method as claimed in claim 1, wherein at least some of the native images are virtual native images that are determined by a temporal interpolation of at least two captured native images and assigned to identical imaging parameters of the captured native images, and wherein acquisition times of the virtual native images match with each other within the reconstruction groups.

6. The method as claimed in claim 1, wherein the three-dimensional reconstructions are registered relative to a volume dataset of the examination object comprising a direction-independent local resolution.

7. The method as claimed in claim 6, wherein the direction-independent local resolution of the volume dataset is at least as high as a best local resolution of the three-dimensional reconstructions.

8. The method as claimed in claim 1, wherein the projection images are locally analyzed.

9. The method as claimed in claim 8, wherein the projection images are three-dimensionally locally analyzed.

10. The method as claimed in claim 1, wherein local resolutions of the three-dimensional reconstructions are collectively identical.

11. The method as claimed in claim 1, wherein local resolutions of the three-dimensional reconstructions are different from each other.

12. The method as claimed in claim 1, wherein the imaging parameters describe how the three-dimensional space has been mapped into the respective projection image.

13. The method as claimed in claim 1, wherein each of the reconstruction groups comprises projection images having specific image times or having image times within a specific time interval.

14. The method as claimed in claim 1, wherein three-dimensional reconstructions of the examination object with direction-dependent local resolutions are determined based on the projection images assigned to the reconstruction groups.

15. A non-transitory computer readable storage medium comprising a computer program for analyzing a plurality of two-dimensional projection images of a three-dimensional examination object, the computer program comprising subroutines for:

assigning a plurality of image times and imaging parameters to the projection images, wherein each of the image times corresponds to an acquisition time when a respective project image is captured;

combining the projection images into a plurality of reconstruction groups based on the assigned image times;

determining a plurality of three-dimensional reconstructions of the examination object based on the projection images assigned to the reconstruction groups;

determining a plurality of reconstruction times based on the image times assigned to the projection images in the reconstruction groups;

assigning the reconstruction times to the three-dimensional reconstructions for generating a temporal sequence of the three-dimensional reconstructions; and analyzing the projection images as a function of the temporal sequence of the three-dimensional reconstructions, wherein the projection images are digital subtraction angiography images that are determined by subtracting native images captured at acquisition times with reference images assigned identical imaging parameters with the native images and the image times of the digital subtraction angiography images correspond to the acquisition times.

16. The non-transitory computer readable storage medium as claimed in claim 15, wherein each of the reconstruction groups comprises projection images having specific image times or having image times within a specific time interval.

17. A computer for analyzing a plurality of two-dimensional projection images of a three-dimensional examination object, comprising a computer program that executes steps of:

assigning a plurality of image times and imaging parameters to the projection images, wherein each of the image times corresponds to an acquisition time when a respective project image is captured;

combining the projection images into a plurality of reconstruction groups based on the assigned image times;

determining a plurality of three-dimensional reconstructions of the examination object based on the projection images assigned to the reconstruction groups;

determining a plurality of reconstruction times based on the image times assigned to the projection images in the reconstruction groups;

assigning the reconstruction times to the three-dimensional reconstructions for generating a temporal sequence of the three-dimensional reconstructions; and analyzing the projection images as a function of the temporal sequence of the three-dimensional reconstructions, wherein the projection images are digital subtraction angiography images that are determined by subtracting native images captured at acquisition times with reference images assigned identical imaging parameters with the native images and the image times of the digital subtraction angiography images correspond to the acquisition times.

18. The computer as claimed in claim 17, wherein the computer is a control device of a fluoroscopy apparatus.

19. The computer as claimed in claim 17, wherein each of the reconstruction groups comprises projection images having specific image times or having image times within a specific time interval.

* * * * *